(12) United States Patent
Oron

(10) Patent No.: US 8,111,629 B2
(45) Date of Patent: Feb. 7, 2012

(54) MEDIA SESSION IDENTIFICATION METHOD FOR IP NETWORKS

(75) Inventor: Avi Oron, Moshav Yahad (IL)

(73) Assignee: I-Spade Technologies Ltd., Bat-Yam (IL)

( * ) Notice: Subject to any disclaimer, the term of this patent is extended or adjusted under 35 U.S.C. 154(b) by 155 days.

(21) Appl. No.: 12/513,510

(22) PCT Filed: Nov. 1, 2007

(86) PCT No.: PCT/IL2007/001336
§ 371 (c)(1),
(2), (4) Date: May 5, 2009

(87) PCT Pub. No.: WO2008/056349
PCT Pub. Date: May 15, 2008

(65) Prior Publication Data
US 2010/0080133 A1    Apr. 1, 2010

Related U.S. Application Data

(60) Provisional application No. 60/856,795, filed on Nov. 6, 2006.

(51) Int. Cl.
*H04J 1/16* (2006.01)
*H04L 12/28* (2006.01)
(52) U.S. Cl. .................. 370/252; 370/392; 709/228
(58) Field of Classification Search .......... None
See application file for complete search history.

(56) References Cited

U.S. PATENT DOCUMENTS

| 6,975,592 | B1 | 12/2005 | Seddigh et al. | |
|---|---|---|---|---|
| 2003/0023744 | A1* | 1/2003 | Sadot et al. | 709/234 |
| 2003/0135667 | A1 | 7/2003 | Mann et al. | |
| 2003/0204562 | A1 | 10/2003 | Hwang | |
| 2004/0152439 | A1* | 8/2004 | Kimura et al. | 455/403 |
| 2004/0249650 | A1* | 12/2004 | Freedman et al. | 705/1 |
| 2006/0120374 | A1* | 6/2006 | Yoshimoto et al. | 370/392 |
| 2007/0050773 | A1* | 3/2007 | Tayyar et al. | 718/102 |
| 2009/0106571 | A1* | 4/2009 | Low et al. | 713/310 |
| 2009/0151006 | A1* | 6/2009 | Saeki et al. | 726/28 |
| 2010/0080133 | A1* | 4/2010 | Oron | 370/252 |
| 2010/0293165 | A1* | 11/2010 | Eldering et al. | 707/737 |

FOREIGN PATENT DOCUMENTS
WO    WO 2008/056349    5/2008

OTHER PUBLICATIONS
International Search Report Dated Oct. 7, 2008 From the International Searching Authority Re.: Application No. PCT/IL07/01336.

(Continued)

*Primary Examiner* — Andrew Lee

(57) ABSTRACT

A method of allocating, restricting or refusing communication resources to media sessions in accordance with individual session or session type, comprises: categorizing passing packets using packet traffic characteristics such as packet length or inter-arrival period; grouping together those packets having similar traffic characteristics, and analyzing the grouped packets for session characteristics, thereby to identify a session type and allocate resources to the session or provisioning or like actions or services.

24 Claims, 6 Drawing Sheets

OTHER PUBLICATIONS

Written Opinion Dated Oct. 7, 2008 From the International Searching Authority Re.: Application No. PCT/IL07/01336.
Supplementary European Search Report and the European Search Opinion Dated Jan. 20, 2011 From the European Patent Office Re. Application No. 07827310.9.
Communication Pursuant to Rules 70(2) and 70a(2) EPC Dated Feb. 8, 2011 From the European Patent Office Re. Application No. 07827310.9.
Response Dated Aug. 8, 2011 to Communication Pursuant to Rules 70(2) and 70a(2) EPC of Feb. 8, 2011 From the European Patent Office Re. Application No. 07827310.9.

* cited by examiner

MEDIA SESSION IDENTIFICATION METHOD FOR IP NETWORKS

RELATED APPLICATIONS

This application is a National Phase Application of PCT Application No. PCT/IL2007/001336 having International Filing Date of Nov. 1, 2007, which claims benefit of U.S. Provisional Patent Application No. 60/856,795, filed on Nov. 6, 2006. The contents of the above Applications are all incorporated herein by reference.

FIELD AND BACKGROUND OF THE INVENTION

The present invention, in some embodiments thereof, relates to a media session identification method for IP networks and, more particularly, but not exclusively, to a media session identification method that identifies media sessions from the flow of packets and assigns specific packets to the media sessions. It is noted that the term "session" includes streaming of data, such as in for example a video stream.

The continuous increase in IP based media traffic over the Internet and other networks, supported by the continuous increase in the various media communication applications, emphasizes the need for IP traffic control tools to cope with the increasingly congested networks. These IP traffic control tools are required by Internet service providers (ISPs), IP-Telephony providers (mobile and fixed) and by Enterprises for implementing traffic shaping measures such as availability of service and quality of service, for firewall enhancements, for providing media session logs supporting billing capabilities and for meeting and supporting lawful interception guidelines set by governments and governmental bodies.

A media session, such as a voice or video session, is expected to have a continuous stream of sampled data so it can be reconstructed at its destination to produce smooth sound or images or both. This means that a minimum amount of data bandwidth has to be sustained on the network. As media at either end is sampled and de-assembled or re-assembled by symmetrical session CODECs (coder & decoder)—data streaming must comply with a certain bandwidth demand and packet-rate so that the human ear or eye at the destination does not experience any information gaps or distortions.

It is desirable to identify packets as belonging to a session to group the succession of IP packets and also to identify a particular application or type that the session belongs to in order to apply provisioning, quality of service and control actions to the session or stream; applications that are real time sensitive such as Voice-over-IP and/or Video-over-IP tend also to be bandwidth availability sensitive, therefore maintaining the quality of service for such application sessions require the identification, and possibly the classification, of their traffic streams. It may also be desirable to identify a session or a stream belonging to a particular application in order to implement and meet interception requirements by law enforcement authorities, as well as in the need to generate CDRs for billing and analysis purposes, and the like. In other cases, some applications may be perceived as prohibited or posing a security risk, that is creating 'security holes', and some networks may be interested in blocking such applications. Again, the best way to do so is to identify the session and the packets belonging to the session and then block packets belonging to the session. For example, many organizations treat Instant-Messaging (IM) applications as high security risks which might create a hole through which sensitive data can flow out of an organization. For those organizations, it is highly essential to identify data flow (e.g. file-transfers) within a media session.

Various methods for analyzing IP traffic are available. The traditional technologies for analyzing and identifying IP traffic (including IP media sessions) include packet header analysis. Packets whose headers indicate the same destination may be assumed to belong to the same session. Packet header analysis is however simplistic. The same user may be running several different sessions simultaneously and mere packet header analysis may not be able to distinguish between them. Thus there is also the so called 'Deep Packet Inspection' method, or the 'Packet Content Analysis'. These known technologies require digging into and analyzing the content, or Payload, of the packets, with the aim of extrapolating signatures or fingerprints of the payloads. The signatures can then be identified with a specific protocol or application. More often than not, the identification process includes analysis of additional factors from the packet 'Header' (e.g. addresses and port numbers). There are several disadvantages of the Deep Packet Inspection approach, of which the major are known to be:

1. Alteration of Payloads: Packet Payloads can change due to changes in the application. Thus a signature that has been extrapolated and correlated to a specific protocol or application can be rendered invalid upon the alteration of the payload due say to a new version release.
2. Encryption of packet content: Certain media applications (e.g. Skype) encrypt the messages, which pose a difficulty in inspecting the Payload of its packets and obtaining a meaningful signature.

In other words, the deep packet inspection method is dependant on elements that can be encrypted or altered by the application and can therefore be initially unreadable or the reading can become invalid if the application alters its content sequence.

In order to at least partly overcome the above problems, it is also known to use Complete Packet Inspection (CPI), which combines header analysis and deep packet inspection, otherwise known as payload pattern search. The header analysis provides additional information that complements the payload pattern search. Complete packet inspection is relatively widely used and applications include network monitoring, application discovery, behavioral analysis, network security, policy enforcement, test and measurement, lawful interception, and trouble shooting.

Nevertheless, both deep packet inspection and complete packet analysis require analysis of multiple packets and their sequence down to the payload. Thus, using deep packet inspection/content inspection on any sizeable network requires strong powerful monitoring processing power as well as huge memory resources, as many thousands of IP sessions occur simultaneously. This renders the solution unfeasible in many cases. In other cases the traffic throughput rate is limited by the inspection capacity. Where the aim is to ensure quality of service for the IP sessions that require it, the very attempt to solve the problem may be making things worse.

State-full inspection Firewalls, Session Border Controllers (SBC) and billing mediation systems each require inspection for their own needs. Thus in some cases the interest may be in blocking the session, in other cases in prioritizing the session and in yet other cases the interest may lie in creating billing records (CDR) for the session. Due to the heavy processing requirement, inspection thus tends to be limited to a relatively small number of simultaneous IP-sessions (e.g. calls) that can be managed, and this prohibits any effective inspection at perhaps the one place it could be most effective, namely at the operator's high-speed backbones.

Some existing data security systems detect and prevent intrusion using simple predefined behavioristic rules and thresholds to alert for abnormal traffic behavior which may indicate possible attacks on the network (customarily implemented in Firewall technologies). Such suspicious behavior may include indications of denial of service (DoS) attacks.

One of the characteristics of a media session is the tendency to consist of a packet stream having a low variation in packet length and/or inter-arrival periods. However, network delay & jittering as well as the fact that some codecs support silence suppression may lead to large inter-arrival period variations.

The existing technologies, including deep and complete packet inspections, do not help specifically in controlling these media sessions for the reasons given above, since the packets are not always recognized.

SUMMARY OF THE INVENTION

The present invention relates to the use of the regularity and similarity characteristics of packet traffic, belonging to a media session, to identify the packets belonging to a given media session, and subsequent identification of the kind of media session, so that the media session can be provisioned and/or controlled (e.g allocating appropriate resources or not allocating at all, as required). In general, the identification is probabilistic as opposed to definitive. Herein the media session may be identified on a number of levels from the most generic to the very specific. All the session identifications from the most generic to the most specific are referred to as the session type. A generic identification may refer to identification of the session type as being video or audio or music or the like, including the identification of interactions within such session, such as instant messaging, file transfer and application sharing. The more specific identifications may involve a specific end-device or application and the term type further includes anything in between. Packet identification or grouping, are terms used to refer to an identification of packets that belong together to a session type in a common session.

According to an aspect of some embodiments of the present invention there is provided electronic network apparatus for identifying media sessions over IP and network packets as belonging or not belonging to a media session, comprising:

a packet characteristic extraction unit configured for obtaining packet characteristics from a succession of packets, the characteristics comprising packet traffic characteristics;

a grouping unit associated with the packet characteristic extraction unit, configured to group together those packets having similar traffic characteristics as probably belonging to a common session, and a session analyzer configured for analyzing the grouped packets for session characteristics, therewith to identify a session type.

The apparatus may comprise a resource allocator for allocating at least one member of the group consisting of resources, provisioning features and control features to the session.

In an embodiment the session type identification comprises identifying an application and/or end-device generating or managing the session.

In an embodiment, the session analyzer comprises a neural network, using characteristics automatically built into the neural network during a neural network training phase.

An embodiment comprises a thresholder for thresholding the traffic characteristics, and a packet session identifier configured to identify those packets whose characteristics are mutually within the thresholds for the grouping unit to group the packets as belonging to the common session.

In an embodiment, the traffic characteristics comprise at least one member of the group consisting of packet length, inter-arrival period, and average bandwidth.

In an embodiment, the grouping unit comprises a packet marker, associated with the packet session identifier, configured for inserting into a header of a respective packet an indication of the common session with which the respective packet has been identified.

An embodiment comprises a session analyzer associated with the packet marker, configured to obtain packets marked as belonging to the common session and to determine, from the packets, characteristics belonging to the common session, therefrom to identify a session type.

In an embodiment, the session analyzer is configured to obtain the characteristics belonging to the common session from parameter patterns common to the packets.

In an embodiment, the session analyzer is configured to use at least one member of the group consisting of:
packet length
inter-arrival period
variance of inter-arrival period
variance of length
covariance of inter-arrival period
covariance of length
a statistical derivative obtained from multi records of packet length
a statistical derivative obtained from multi records of inter-arrival period
a histogram built of at least one of the following;
  i. packet length
  ii. inter-arrival period
  iii. variance of inter-arrival period
  iv. variance of length
  v. covariance of inter-arrival period
  vi. covariance of length
  vii. a statistical derivative obtained from multi records of packet length
  viii. a statistical derivative obtained from multi records of inter-arrival period
a matrix histogram built of at least one of the following;
  i. packet length
  ii. inter-arrival period
  iii. variance of inter-arrival period
  iv. variance of length
  v. covariance of inter-arrival period
  vi. covariance of length
  vii. a statistical derivative obtained from multi records of packet length
  viii. a statistical derivative obtained from multi records of inter-arrival period In an embodiment, the session analyzer comprises a neural network, using characteristics automatically built into the neural network during a neural network training phase.

An embodiment comprises a resource allocator configured to allocate resources on a network according to the identified common session.

An embodiment comprises a resource allocator, configured to allocate resources on a network according to the identified session type An embodiment comprises at least one of the packet session analyzer, the extraction unit and the grouping unit comprises a neural network.

According to a second aspect of the present invention there is provided a method of identifying session type, comprising categorizing passing packets using traffic packet characteristics;

grouping together those packets having similar values of the traffic characteristics, and analyzing the grouped packets for session characteristics, thereby to identify a session type.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
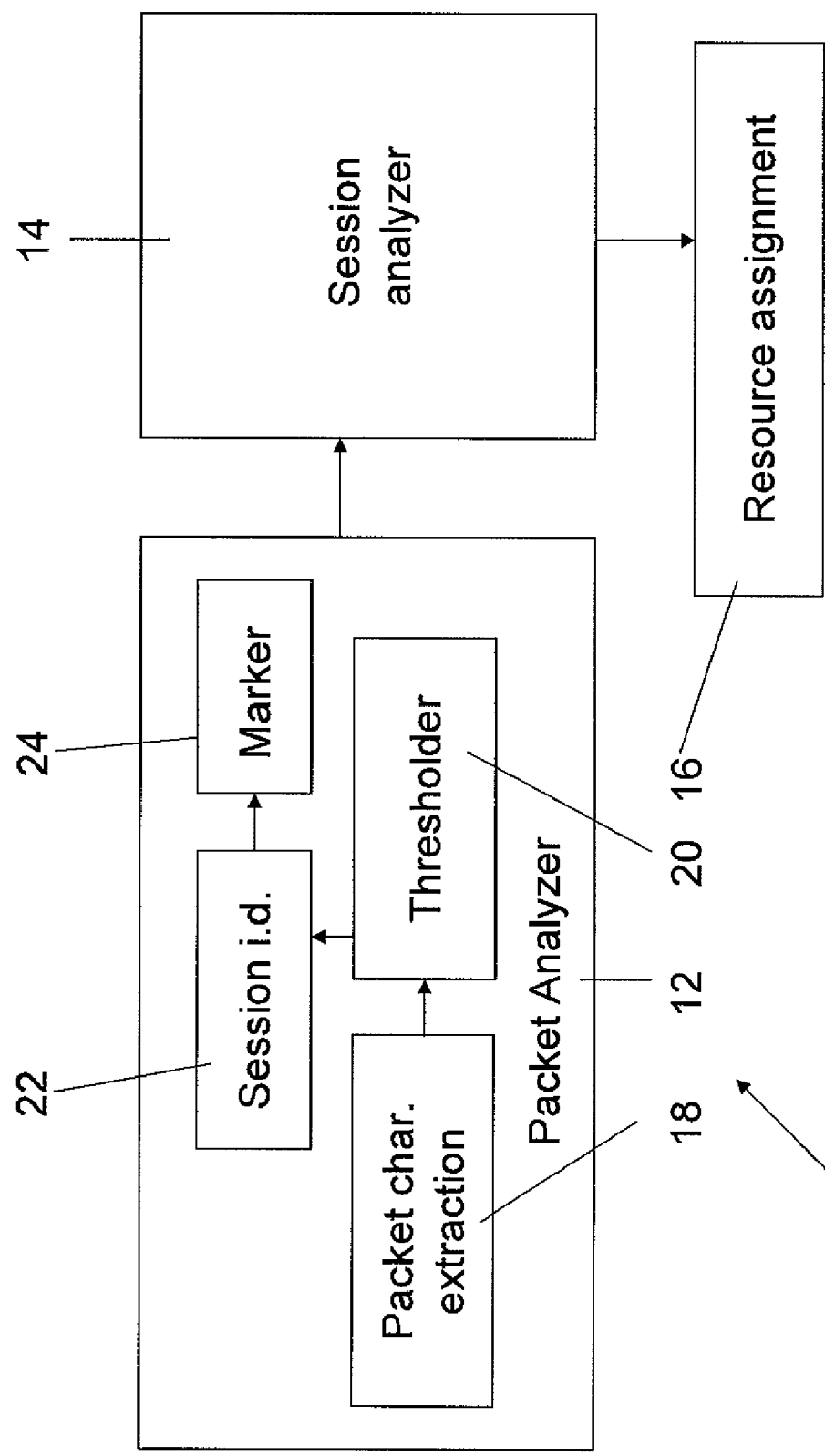
FIG. 1 is a simplified block diagram showing a packet and session identification apparatus according to a first embodiment of the present invention.

The present invention, in some embodiments thereof, relates to IP traffic inspection by means of identifying those packets having similar traffic characteristics as probabilistically belonging to the same media session. Traffic characteristics relate to those parameters inherent to packets traffic flow as it travels from source to destination and includes features such as packet length, inter-arrival period, bandwidth and statistical and other derivations thereof as well as certain header characteristics such as source address and destination address but excludes packet payload content whose inspection is common in deep packet inspection (packet content inspection) techniques. The traffic characteristics may also be used to identify the session type so that appropriate resources can be made available or not for the session, or other provisioning and control actions may be applied to the session.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates electronic network apparatus 10 for identifying media sessions and network packets as belonging or not belonging to a media session, grouping, and for determining a session type. As explained the determinations need not be absolute but may be probabilistic. Apparatus 10 comprises a packet analyzer unit 12 and a session analyzer unit 14. A resource assignment unit 16 assigns, or for that matter limits or refuses, network resources to the identified media session so that individual packets are given a priority level according to the needs of the media session to which they are found to belong, or may provide other provisioning or control actions for the session.

The packet analyzer 12 analyzes incoming data packets and determines which packets belong to a common session. The packet analyzer 12 includes a packet characteristic extractor 18 which extracts readily available packet traffic characteristics such as packet length or inter-arrival period, or source or destination addresses or other traffic characteristics of the packets. Readily available characteristics are those characteristics that do not require deep analysis of the packet content. Preferably, characteristics that can be obtained from mere observable traffic behavior examination, without opening the packet, are used. The packet characteristic extraction unit obtains these packet characteristics from a succession of packets.

A thresholder 20 is connected to the packet characteristic extraction unit, and sets up thresholds based on the characteristics found by the extractor. Generally there is a certain amount of uniformity in packets belonging to the same session, thus they tend to be approximately the same length and to turn up at approximately regular intervals. Thus thresholding for length or inter-arrival period or even better for both, allows for packets to be assigned to a common session with relatively high probability. A packet session identifier 22 uses the thresholds set up by the thresholder to identify as belonging to a common session those packets whose characteristics are mutually within the thresholds.

As mentioned, effective characteristics include but are not limited to packet length and inter-arrival period.

A packet marker 24 may insert an indication of the common session with which a given packet has been identified into its header. Thus packets believed to belong to the same session can be grouped together so that the session itself can be analyzed.

For the purpose of finding out information about the session, session analyzer 14 analyzes the grouped together packets to obtain characteristics that could provide important information about the session type and its requirements. That is to say a session could be identified as being a video session and therefore having a real time quality of service requirement. If possible, an accurate session type, such as a video session using codec type X, or voice session using Skype™, is obtained.

In general a media stream tends to have a small packet rate variation, and also relatively small packet length, or at least small variation in the packet length. The method can thus inspect passing packets to see which of the passing packets correspond on this basis and group them together with high probability.

A good source of information that the session analyzer can use is the meta-level parameters which are often included in the packet headers.

The session analyzer may use the packet's traffic characteristics, such as packet length and/or inter-arrival period to indicate the session type.

In one embodiment, the session analyzer comprises a neural network. In this case the characteristics used for identifying the session type are automatically built into the neural network during the neural network training phase, and are not explicitly programmed in.

The packets are now assigned to corresponding sessions, and resources are assigned to the session, so that each packet gets priority or otherwise, depending on the session to which it has been assigned. Thus a video session requiring real time quality of service may receive high bandwidth and its packets may be given high priority. At the other extreme, a chat session may be regarded as a security risk and its packets may be assigned zero resources and dumped or simply blocked.

The present embodiments are now considered in greater detail. The present embodiments identify and distinguish between different media sessions within IP network traffic using certain packet related elements or characteristics, primarily but not exclusively packet length and packet inter-arrival period. In practice the methodology may not use these characteristics directly but rather may make use of a range of statistical parameters which are derivatives thereof. The elements are external elements that do not require opening of the packet payload, so that there is no dependency on packet elements that can be altered, hidden or encrypted by the application. That is to say encrypting the payload has no effect on the methodology and updates to software versions are unlikely to change the packets so radically that the session types, at least in terms of quality of service requirement, would not be recognized.

The algorithm expects the two parameters of packet length and packet inter-arrival period to meet certain thresholds if indeed the packets belong to the same session. Packets that belong to the same session generally have a constant average bandwidth, or at least an average bandwidth that maintains continuity. The average bandwidth is the average packet length divided by average inter-arrival period, and the average bandwidth may be used by the method as a derivative of the above packet characteristics to indicate belonging or not belonging to a session.

Thresholding of the packet length and packet inter-arrival period, or of a derivative such as statistical variations, sets a basic acceptance criterion for a packet to be considered as part of a media stream, against which each consecutive incoming IP packet is examined. Those packets that meet the acceptance criteria are categorized and marked, at high probability, as media session packets, while those packets that do not meet the acceptance criteria are filtered out or ignored as appropriate.

Using these markings, the marked media session packets are assembled to create the various media streams, which streams are subsequently analyzed using predefined mathematical and statistical techniques for determining more specific conclusions on the media session protocol and even the application or end-devices being used.

Specific constant packet lengths and length-variation behaviors, along with specific packet-rate and rate-variation may further indicate standard and non-standard codecs, session protocols, media type and sometimes even the actual end-point media device being used.

Thus, a packet length histogram may be created by the algorithm and can be used to determine whether the media is using a Constant Bit Rate (CBR) Codec (e.g. G.723.1, G.729A) or a Variable Bit Rate (VBR) Codec (such as the GIPS codec). The G.729A codec for instance, uses constant packet length of 50/60/70 bytes and a corresponding packet inter-arrival period of 100/50/33 PPS (packets per second).

Figure 2:
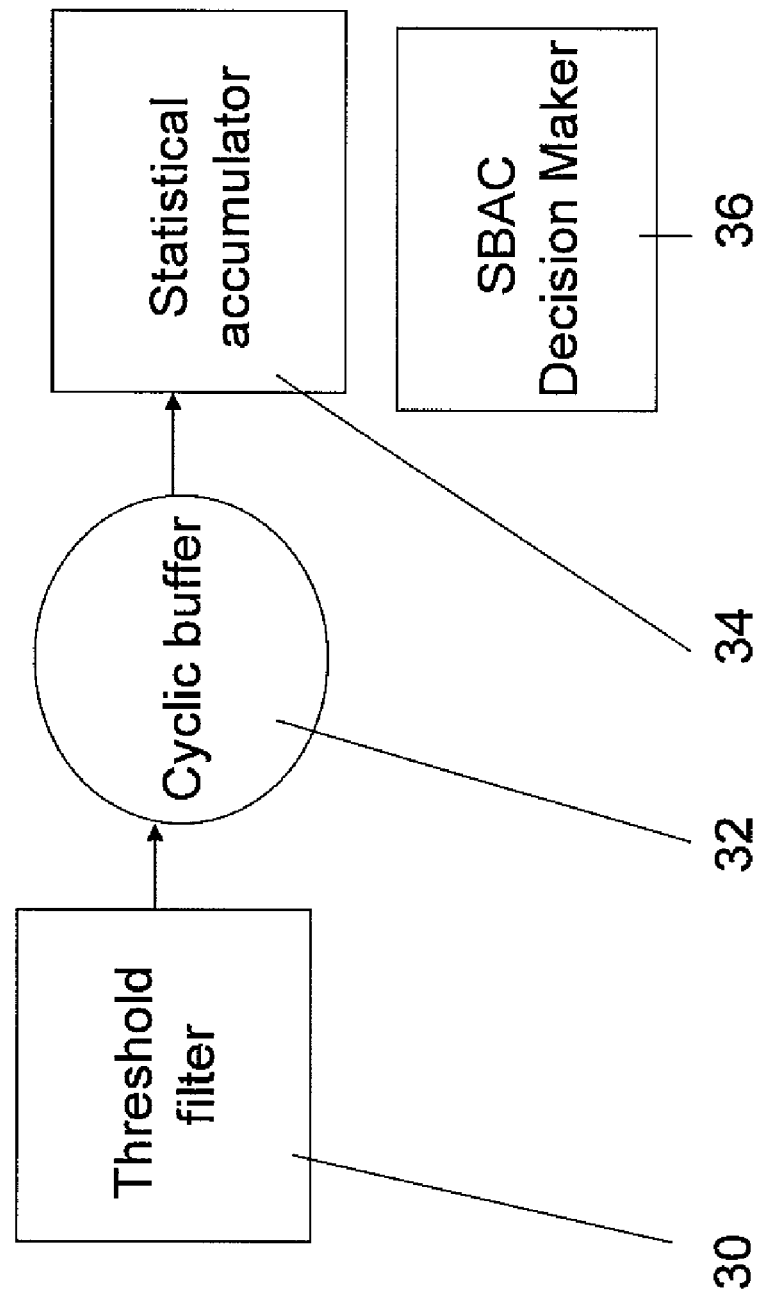
FIG. 2 is a simplified block diagram showing a general implementation of the apparatus of FIG. 1.

Reference is now made to FIG. 2, which is a simplified block diagram illustrating a more detailed embodiment of the apparatus of FIG. 1. Packets initially enter threshold filter 30. The filter can possibly contain a pre-filter stage in which it filters out those packets having a length and/or inter-arrival period and/or derivates thereof which could not possibly represent a media session, that is anything whose length and/or inter-arrival period and/or derivates thereof is above or below a predefined maximum and minimum threshold. Such a pre-filtering stage with preset thresholds filters out packets belonging to large file transfer actions or web browsing, or small TCP connection related and acknowledge and like packets.

Following the pre-filter stage there is a characteristic dependent stage in which the packets are checked against characteristic dependent thresholds, for packet length and inter-arrival period to be within a small range, say 10%. Those packets within the threshold are marked as belonging to the media session with high probability.

More specifically, since IP media packets are entwined with data packets, the algorithm skips packets with unlikely data length or wrong packet rate, as compared with a previous media suspected packet.

Those packets that pass the threshold filter may be fed into a cyclic buffer 32. The cyclic buffer 32 emulates a Jitter-Buffer at the receiving end and allows for bandwidth continuity verification. Consecutive Packets with bandwidth complying with the jitter-buffer's average bandwidth are accepted as potentially true media session packets. A sequence of such packets may indicate a media session.

Packet length, inter-arrival period ("dt") and their derivatives may be accumulated by statistical accumulator 34 to create a statistical vector of session behavioral information. The derivatives may be statistical parameters such as:

Average dt, Average length, Variance of dt & length, Covariance of dt & length

Histograms of dt & lengths, Histogram matrixes of lengths variation vs. dt variation Using the above derivatives, statistical behavioral acceptance criteria (SBAC) may be extrapolated, according to which SBAC media sessions are determined and categorized in SBAC decision maker 36. For example, for an incoming media stream of a given sort, the Average, Variance & Covariance of dt, length & bandwidth would not be expected to fluctuate over certain limits which are set by the SBAC. Thus the sort of media stream can be derived.

Figure 3:
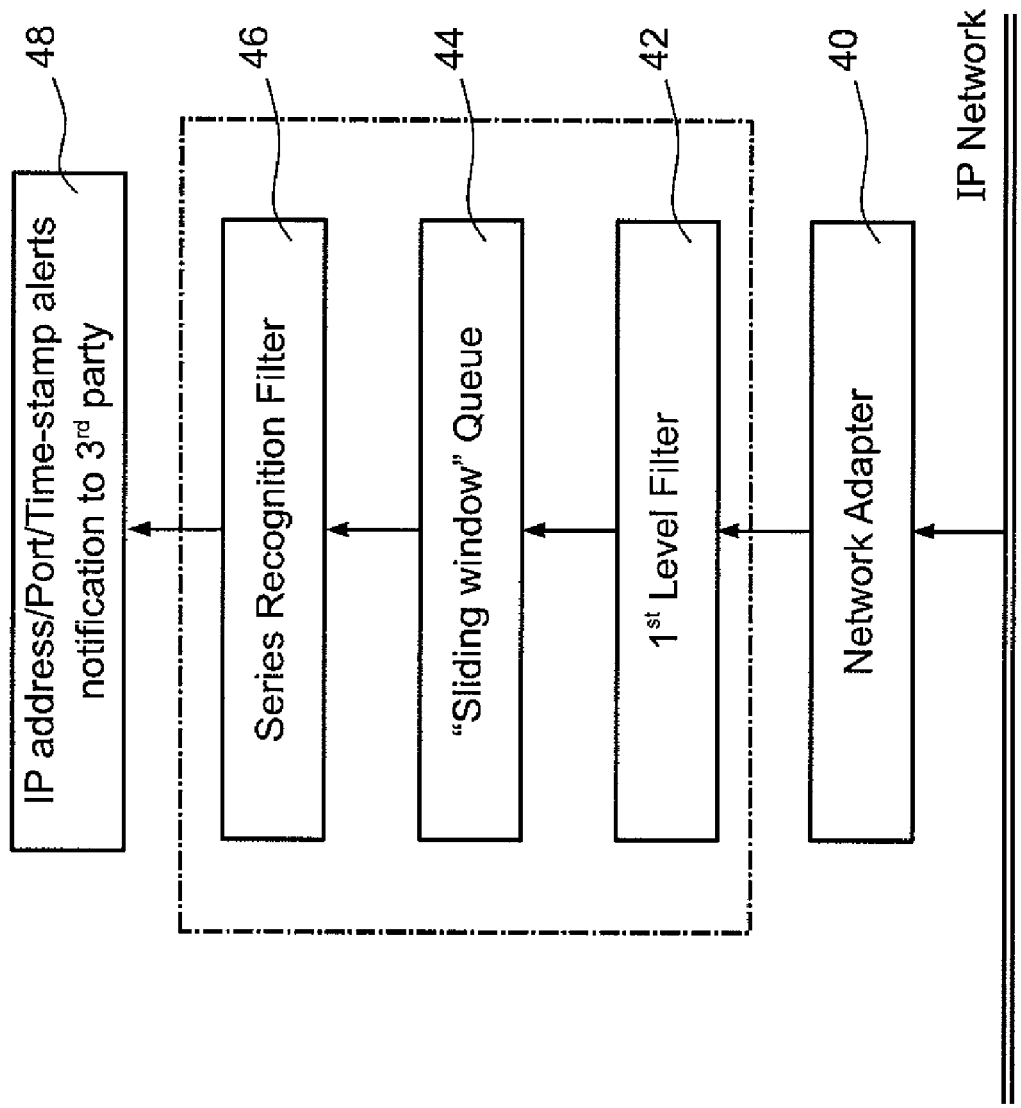
FIG. 3 is a simplified block diagram showing another embodiment of the present invention.

Reference is now made to FIG. 3, which is a simplified diagram showing a network probe according to a second embodiment of the present invention. A network adaptor 40 listens to all network traffic. A first level filter 42 then carries pre-filtering to remove irrelevant packets and first level filtering to extract those packets within the length threshold of the suspected stream and.

The extracted packets are passed to sliding window 44 to create a queue of those packets whose inter-arrival periods correspond, that is they arrive with a regular frequency and therefore could belong to the same media session.

Series recognition filter 46 analyses the queue to detect a media session. Extractor 48 then extracts IP addresses, port, time stamps etc, to allow higher layers or third party equipment to handle the identified sessions.

Figure 4:
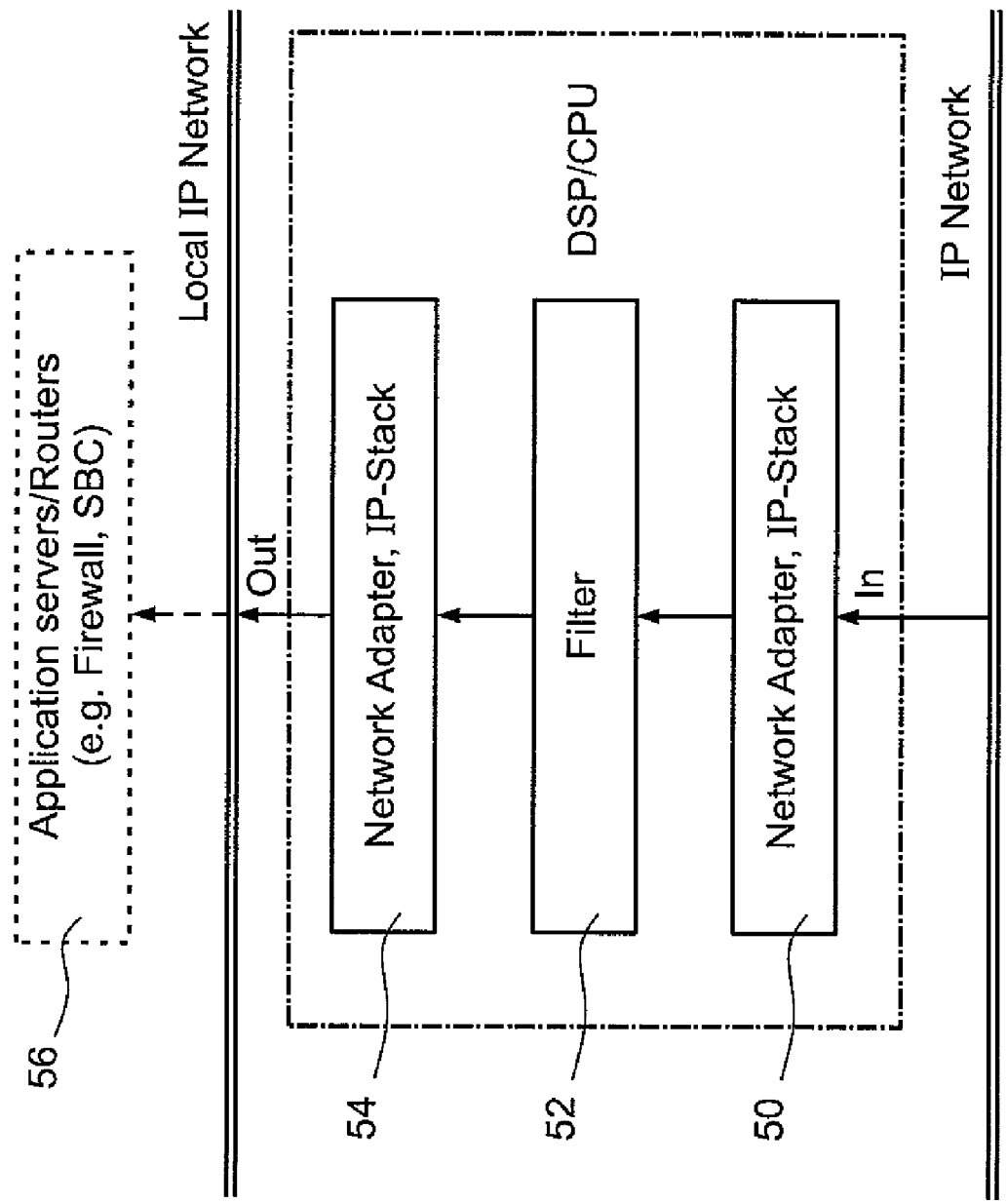
FIG. 4 is a simplified block diagram showing a hardware implementation of the embodiment of FIG. 3.

Reference is now made to FIG. 4, which is a simplified diagram showing an implementation of apparatus according to the present embodiments as standalone hardware. The network adaptor of FIG. 3 is implemented as an IP stack 50. The filter itself 52 is implemented on a general purpose CPU or a specific DSP, and an additional network adapter 54 connects to a local IP network which runs supported applications 56 such as billing servers.

Figure 5:
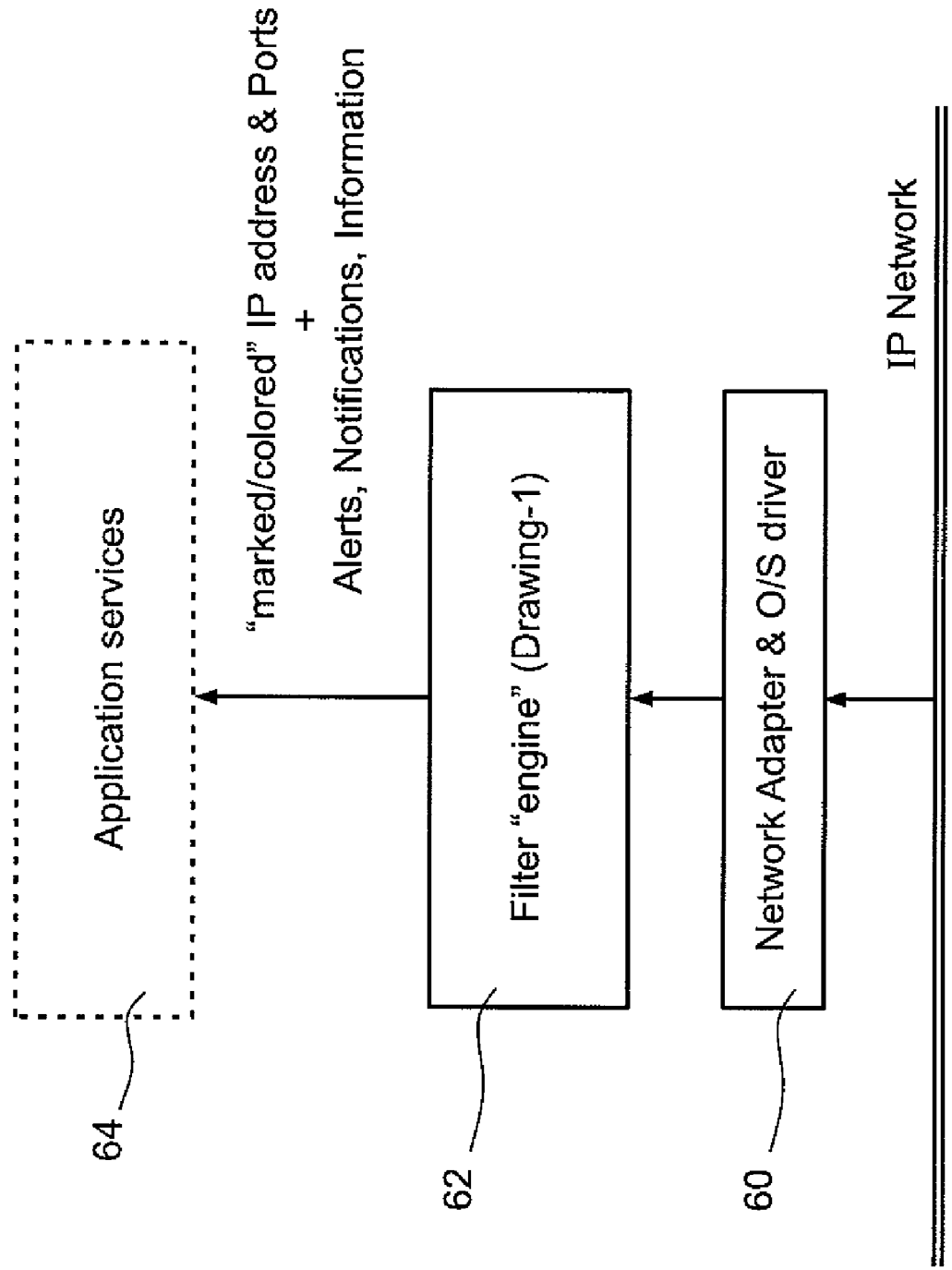
FIG. 5 is a simplified block diagram showing a software layer implementation of the embodiment of FIG. 3.

Reference is now made to FIG. 5, which is a simplified block diagram illustrating an implementation of the present embodiments in software. In the software case the filter 62 is a software layer between the network interface card (NIC) driver 60 and the application layer 64.

A further implementation uses Neural Networks. Neural networks and like algorithms, including pattern matching algorithms, can be used for either identification, classification or both phases.

A neural network is injected with a vector of statistical behavior of a sub-stream of packets. That is to say it is presented with statistical behavior of a sliding window portion of the media session. The vector may include both linear and non-linear (e.g. logarithmic, multiplication & power-function) statistics of accumulated information. The network is pre-trained (using supervised learning) so that it includes appropriate gains at each perceptron input. A hidden layer may be included within the network for part of the non-linear input behaviors.

The neural network preferably has multiple outputs one for each required session type identification or classification. These may include generic types such as "video stream", or "voice stream" or "chat session", and specific application outputs such as Skype session, MSN session, as well as specific end-device outputs such as the Cisco-ATA unit.

Each output preferably comprises a transient function, for example a Gaussian function, which produces a "1" to indicate a detection.

Neural networks being statistical or fuzzy, multiple outputs can become active—indicating that several networks may have detected the stream. In such as case, the strongest output is used as the correct identification, as is known in the field of neural networks.

Furthermore, the neural network may use non-supervised training, for example Self-Organizing Maps, SOM, to adapt itself and increase accuracy during operation.

Once a session is identified and categorized, the algorithm generates events and/or alerts for each media session, which can be passed on to higher layers or to third party devices. The events or alerts may include:

The sending and receiving IP addresses. These may be extracted from the source and destination fields in the packet header. Of course in the case of conference sessions there may be more that two such addresses. It is noted that end-users with fixed (i.e. static) IP address, may use similar media traffic in the future as well, so that there may be some benefit to caching these IP-addresses for recognition later on. The cached addresses could be saved by the algorithm filter or by the upper layer for a certain duration and marked as "suspected IP-addresses" for future inspection.

IP-Port numbers associated with the session can be extracted from "Source Port" and "Destination Port" fields in the header. Note that some applications (e.g. Skype) tend to use the same Port-number for future media sessions, so that the Port-numbers could usefully be cached, along with the suspect IP-addresses as described above—to accelerate the detection process and/or increase detection probability factor for future sessions.

"Session Start" and "Session End" time stamps (to milliseconds resolution) can be recorded to indicate call duration. Such is useful where the primary motivation of monitoring the session is for billing purposes, for example in billing mediation systems.

Session media type information, including media classification: voice call, video call etc may be recorded.

Data transfer within a media session, may be identified, say by detecting sharp fluctuations in Bandwidth at various times during a media session. The durations or the bandwidth may be recorded as required.

Session protocol type indicating the application or end-device being used if available may be recorded. An indication may be provided as to which standard if the session is a standard based session, that is based on Codecs conforming to a given standard. If possible an indication of the exact Codec used may be provided. Likewise an indication of a non-standard Codec based session, e.g. Skype, may be provided as an event.

The identification engine may be implemented in any suitable form. The implementation may include sequential logic using hardware or software modules to implement the above described features. Alternatively, the identification engine may be implemented in whole or in part by a Neural Network, whether pre-trained or self-trained. Other artificial intelligence mechanisms may be used in place of neural networks and the system may use a general purpose CPU or dedicated DSP components. Alternatively any combination of the above may be used.

Figure 6:
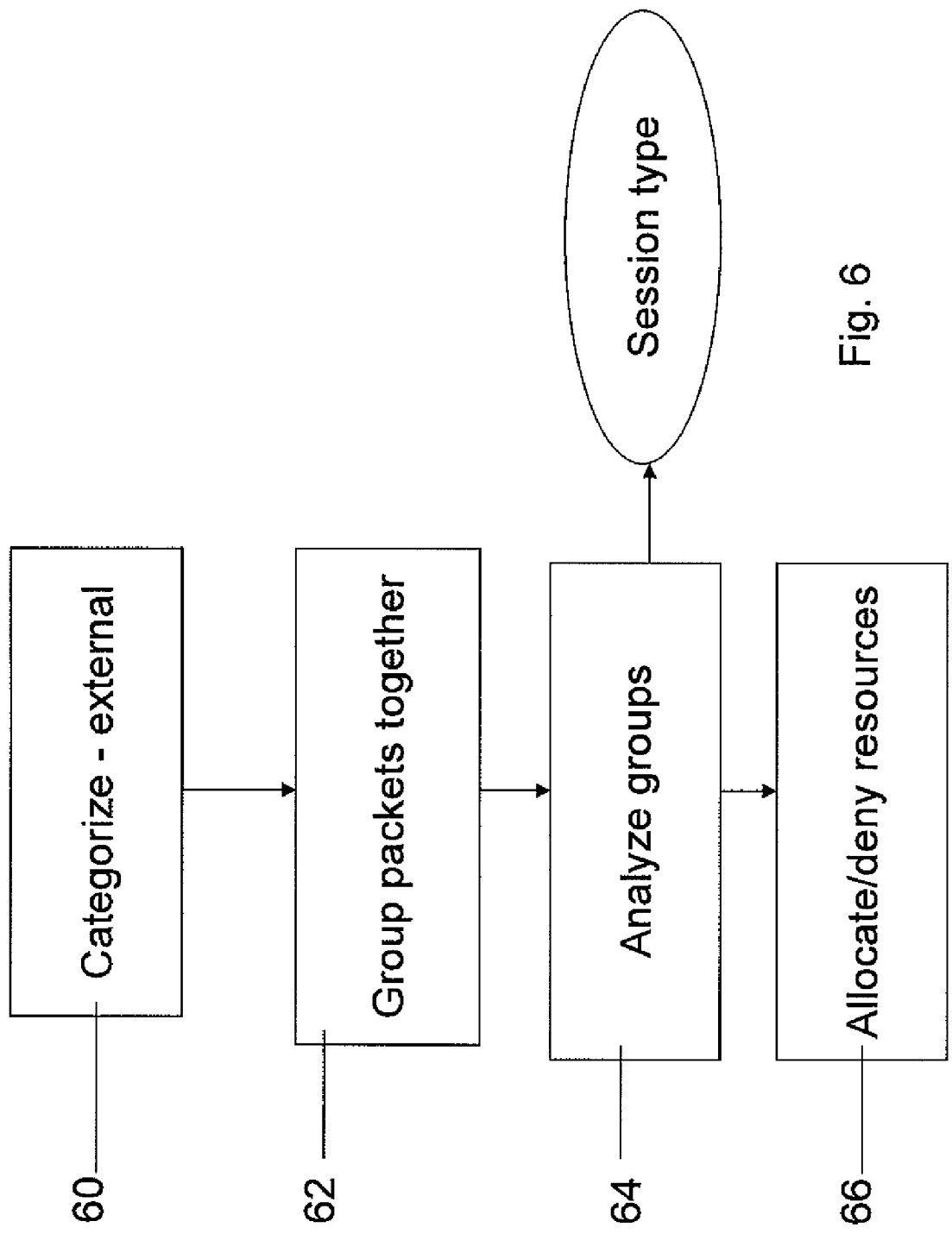
FIG. 6 is a simplified flow chart showing a method of analyzing packets for media sessions according to an embodiment of the present invention.

Reference is now made to FIG. 6, which is a simplified flow chart illustrating operation of a method according to the presently preferred embodiments. A method of allocating communication resources to media sessions in accordance with session type, comprises a first stage 60 of categorizing passing packets using external packet characteristics, such as length, inter-arrival period, or derivatives thereof.

A second stage 62 involves grouping together those packets having similar values of the external characteristics. Upper and lower thresholds are used based on the premise that packets of the same session vary only by small amounts. The thresholds may be dynamic since larger changes in the packets may occur over longer timescales.

A third stage 64 involves analyzing those packets which have been grouped together as having a high probability of belonging to the same session, for session characteristics. The session characteristics allow a session type to be identified and then in stage 66, resources can be assigned accordingly.

In one alternative, packets may be marked so that the network resource management can identify the relevant packets for resource allocation.

Advantages of the above embodiments include the possibility of inspection of high bandwidth IP traffic to allow media session detection using low computing resources. The system allows ubiquitous implementation of the identification technology on large and small network structures.

The present embodiments may be used with applications such as Session Border Controllers, Firewalls & billing mediation servers. The present embodiments allow media sessions to be filtered out and identified so that the application need only analyze relevant media traffic. Prior art versions of these applications had to filter out the packets of interest from the total high bandwidth traffic, meaning they had to inspect all the passing traffic.

In the claims that follow, the term "session managing entity refers to any application or endpoint device or terminal unit which manages or generates a session.

It is expected that during the life of a patent maturing from this application many relevant Internet Protocol transport variations will be developed and the scope of the term Internet Protocol is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Electronic network apparatus for identifying media sessions over IP and network packets as belonging or not belonging to a media session, comprising:
    a packet characteristic extraction unit configured for obtaining traffic packet characteristics from a succession of packets, said packets respectively belonging to various unknown sessions;
    a grouping unit associated with said packet characteristic extraction unit, configured to compare packets with other packets according to said extracted traffic characteristics to group together those packets whose extracted packet traffic characteristics are similar as probably belonging to a common session, and
    a session analyzer configured for analyzing said grouped packets for session characteristics, therewith to identify a session type of said probable common session.

2. The apparatus of claim 1, further comprising a resource allocator for allocating at least one member of the group consisting of resources, provisioning features and control features to said session.

3. The apparatus of claim 1, wherein said session type identification comprises identifying a session managing entity generating or managing said session.

4. The apparatus of claim 1, wherein said session analyzer comprises a neural network, using characteristics automatically built into said neural network during a neural network training phase.

5. Apparatus according to claim 1, further comprising a thresholder for thresholding said traffic characteristics, and a packet session identifier configured to identify those packets whose characteristics are mutually within said thresholds for said grouping unit to group said packets as belonging to said common session.

6. The apparatus of claim 1, wherein said traffic characteristics comprise at least one member of the group consisting of packet length, inter-arrival period, and average bandwidth.

7. The apparatus of claim 1, wherein said grouping unit comprises a packet marker, associated with said packet session identifier, configured for inserting into a header of a respective packet an indication of said common session with which said respective packet has been identified.

8. The apparatus of claim 7, further comprising a session analyzer associated with said packet marker, configured to obtain packets marked as belonging to said common session and to determine, from said packets, characteristics belonging to said common session, therefrom to identify a session type.

9. The apparatus of claim 8, wherein said session analyzer is configured to obtain said characteristics belonging to said common session from parameter patterns common to said packets.

10. The apparatus of claim 8, wherein said session analyzer is configured to use at least one member of the group consisting of:
    packet length
    inter-arrival period
    variance of inter-arrival period
    variance of length
    covariance of inter-arrival period
    covariance of length
    a statistical derivative obtained from multi records of packet length
    a statistical derivative obtained from multi records of inter-arrival period
    a histogram built of at least one of the following;
        i. packet length
        ii. inter-arrival period
        iii. variance of inter-arrival period
        iv. variance of length
        v. covariance of inter-arrival period
        vi. covariance of length
        vii. a statistical derivative obtained from multi records of packet length
        viii. a statistical derivative obtained from multi records of inter-arrival period a matrix histogram built of at least one of the following;
  i. packet length
  ii. inter-arrival period
  iii. variance of inter-arrival period
  iv. variance of length
  v. covariance of inter-arrival period
  vi. covariance of length
  vii. a statistical derivative obtained from multi records of packet length
  viii. a statistical derivative obtained from multi records of inter-arrival period.

11. The apparatus of claim 8, wherein said session analyzer comprises a neural network, using characteristics automatically built into said neural network during a neural network training phase.

12. The apparatus of claim 1, further comprising a resource allocator configured to allocate resources on a network according to said identified common session.

13. The apparatus of claim 8, further comprising a resource allocator, configured to allocate resources on a network according to said identified session type.

14. The apparatus of claim 1, wherein at least one of said packet session analyzer, said extraction unit and said grouping unit comprises a neural network.

15. A method of identifying session type, comprising
  obtaining passing packets of respectively unknown sessions and unknown session types;
  obtaining traffic packet characteristics of said passing packets of respectively unknown session types;
  comparing said obtained packets with each other using respectively obtained traffic packet characteristics;
  grouping together those packets having similar values of said traffic packet characteristics into a presumed session; and
  analyzing said grouped packets of said presumed session for session characteristic;
  using said session characteristics to identify a session type of said presumed session.

16. The method of claim 15 wherein said identifying a session type comprises identifying a session managing entity generating or managing said session.

17. The method of claim 15 wherein said identifying a session type is followed by at least one of the group comprising: providing provisioning and providing control actions to the session.

18. Method according to claim 15, further comprising thresholding said traffic characteristics, and identifying those packets whose characteristics are mutually within said thresholds for said grouping.

19. The method of claim 15, wherein said characteristics comprise at least one member of the group consisting of packet length, inter-arrival period, and average bandwidth.

20. The method of claim 15, further comprising inserting into a header of a respective packet an indication of said presumed session with which said respective packet has been identified.

21. The method of claim 15, comprising obtaining said characteristics belonging to said presumed session from parameter patterns common to said packets.

22. The method of claim 15, comprising using at least one member of the group consisting of:
  packet length
  inter-arrival period
  variance of inter-arrival period
  variance of length
  covariance of inter-arrival period
  covariance of length
  a statistical derivative obtained from multi records of packet length
  a statistical derivative obtained from multi records of inter-arrival period
  a histogram built of at least one of the following;
    i. packet length
    ii. inter-arrival period
    iii. variance of inter-arrival period
    iv. variance of length
    v. covariance of inter-arrival period
    vi. covariance of length
    vii. a statistical derivative obtained from multi records of packet length
    viii. a statistical derivative obtained from multi records of inter-arrival period
  a matrix histogram built of at least one of the following;
    i. packet length
    ii. inter-arrival period
    iii. variance of inter-arrival period
    iv. variance of length
    v. covariance of inter-arrival period
    vi. covariance of length
    vii. a statistical derivative obtained from multi records of packet length
    viii. a statistical derivative obtained from multi records of inter-arrival period.

23. The method of claim 15, comprising using a neural network and characteristics automatically built into said neural network during a neural network training phase.

24. The method of claim 16, further comprising using a neural network and characteristics automatically built into said neural network during a neural network training phase.

* * * * *